(12) United States Patent
Louie et al.

(10) Patent No.: US 11,724,467 B2
(45) Date of Patent: Aug. 15, 2023

(54) SYSTEM AND METHOD FOR LAYING UP COMPOSITE BARREL SHAPED STRUCTURES

(71) Applicant: The Boeing Company, Chicago, IL (US)

(72) Inventors: Michael Kenneth-Que Louie, Renton, WA (US); Todd Rudberg, Shoreline, WA (US); Brent L. Thayer, Mukilteo, WA (US); Jordan S. Erickson, Federal Way, WA (US); Keith Duane Price, St. George, UT (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 17/452,584

(22) Filed: Oct. 28, 2021

(65) Prior Publication Data

US 2022/0194024 A1 Jun. 23, 2022

Related U.S. Application Data

(60) Provisional application No. 63/127,640, filed on Dec. 18, 2020.

(51) Int. Cl.
*B29C 70/32* (2006.01)
*B29C 70/54* (2006.01)
*B29L 31/30* (2006.01)

(52) U.S. Cl.
CPC .............. *B29C 70/32* (2013.01); *B29C 70/54* (2013.01); *B29L 2031/3082* (2013.01)

(58) Field of Classification Search
CPC ...................................................... B29C 70/32
See application file for complete search history.

(56) References Cited

U.S. PATENT DOCUMENTS

| 7,282,107 | B2 | 10/2007 | Johnson et al. | |
| 7,407,556 | B2* | 8/2008 | Oldani | B29C 53/66 |
| | | | | 156/367 |
| 7,720,561 | B2 | 5/2010 | Tang et al. | |
| 8,974,618 | B1* | 3/2015 | Rotter | B29D 99/0025 |
| | | | | 156/196 |
| 9,796,483 | B2 | 10/2017 | Chang et al. | |

(Continued)

FOREIGN PATENT DOCUMENTS

| CA | 2833975 A1 * | 1/2013 |
| EP | 2505343 A1 | 10/2012 |
| WO | 2012046021 A1 | 4/2012 |

OTHER PUBLICATIONS

Extended European Search Report dated Apr. 28, 2022, regarding Application No. 21206163, 6 pages.

*Primary Examiner* — Jeffry H Aftergut
(74) *Attorney, Agent, or Firm* — Yee & Associates, P.C.

(57) ABSTRACT

A composite barrel is laid up on a rotatable mandrel using laminators that apply composite material on the mandrel. The laminators are arranged on opposite sides of the mandrel and apply composite material to a first region of the mandrel while the mandrel is held stationary in a first rotational position. The mandrel is rotated to a second rotational position where it is held stationary as the laminators apply composite material to a second region of the mandrel to complete the layup. Plies in the first and second regions are spliced together during the layup process.

20 Claims, 16 Drawing Sheets

(56) References Cited

U.S. PATENT DOCUMENTS

| | | |
|---|---|---|
| 9,957,031 B2 | 5/2018 | Golshany et al. |
| 2009/0082891 A1* | 3/2009 | Tang ................... B29C 70/386 700/100 |
| 2009/0084486 A1 | 4/2009 | Tang et al. |
| 2009/0148647 A1* | 6/2009 | Jones ................... B29C 70/38 156/159 |
| 2012/0073738 A1 | 3/2012 | Crothers |
| 2017/0061068 A1* | 3/2017 | Golshany ................ G06F 30/00 |

* cited by examiner

SYSTEM AND METHOD FOR LAYING UP COMPOSITE BARREL SHAPED STRUCTURES

CROSS-REFERENCE TO RELATED APPLICATION

This application claims the benefit of U.S. Provisional Patent Application Ser. No. 63/127,640, filed Nov. 18, 2020, and entitled "System and Method for Laying Up Composite Barrel Shaped Structures;" which is incorporated herein by reference in its entirety.

BACKGROUND INFORMATION

1. Field

The present disclosure generally relates to processes and equipment for producing composite structures, and deals more particularly with a system and method for laying composite barrel shaped structures, such as a section of an airplane fuselage.

2. Background

A barrel shaped airplane fuselage may be fabricated in sections by laying up composite material on a cylindrical mandrel using multiple laminators. The laminators comprise numerically controlled fiber placement heads that move over the mandrel, laying up different portions the barrel section. In order to increase production speed, the mandrel is rotated at the same time the placement heads are moving, requiring coordination of placement head movement with mandrel rotation.

The coordination of laminator operation with mandrel rotation requires sophisticated drive, sensing and control equipment in order to precisely synchronize movement of the placement heads with rotation of the mandrel. This precision requirement increases the cost and complexity of the equipment. Also, some of the equipment required to rotate the mandrel in this manner is large and bulky which makes moving the mandrel through narrow spaces such as into an autoclave, more difficult. Furthermore, the technique described above is less than fully efficient because when using two laminators are used to lay up a barrel section, one of the laminators typically experiences near 100% utilization while the second laminator is dependent on progress of the first laminator and is therefore idle a portion of the time.

Accordingly, it would be desirable to provide a system and method for laying up composite barrels that overcomes the disadvantages discussed above through the use of simplified, less costly equipment, while increasing layup efficiency and production throughput.

SUMMARY

The disclosure relates in general to the fabrication of composite structures, and more specifically to a method and apparatus for laying up barrel shaped structures such as sections of airplane fuselages.

According to one aspect, a method of laying up a composite barrel on a mandrel is provided. The method includes rotating the mandrel to each of at least first and second positions of rotation, and holding the mandrel stationary against rotation at each of the first and second positions of mandrel rotation. The method further includes laying up plies of composite material on a first region of the mandrel while the mandrel is being held stationary at the first position of mandrel, and laying up plies of composite material on a second region of the mandrel while the mandrel is being held stationary at the second position of mandrel. The method also includes forming splices between the plies in the second region with the plies in the first region.

According to another aspect, a method is provided of laying up a composite barrel on a mandrel. The method comprises arranging first and second laminators respectively, on opposite sides of the mandrel, and rotating the mandrel to a first rotational position of the mandrel presenting first and second zones on the mandrel that are respectively within reach of the first and second laminators. The method includes holding the mandrel stationary against rotation in the first rotational position, and laying up plies of composite material on the mandrel in at least one of the first and second zones using first and second laminators respectively while the mandrel is held stationary in the first rotational position thereof. The method further includes rotating the mandrel to a second rotational position of the mandrel presenting third and fourth zones on the mandrel that are respectively within reach of each of the first and second laminators. The method further includes holding the mandrel stationary against rotation in the first rotational position, and laying up plies of composite material on at least one of the third and fourth zones on the mandrel using the first and second laminators respectively while the mandrel is held stationary in the second rotational position thereof.

According to still another aspect, a system is provided for laying up a composite barrel. The system comprises a generally cylindrical mandrel configured to be rotated about a central axis. The system includes first and second laminators respectively arranged on opposite sides of the mantle, wherein each of the first and second laminators has a reach and includes a lamination head configured to apply composite material on the mandrel within its reach. The system also includes a drive configured to rotate the mandrel about the central axis to at least first and second rotational positions, and hold the mandrel stationary at the first and second rotational positions. The system further includes a controller configured to control operation of the drive, and operation of the first and second laminators such that the lamination heads of move over the mandrel and apply composite material on the mandrel as a mandrel remains stationary at each of the first and second rotational positions.

One of the advantages of the disclosed method and apparatus is that composite barrel sections may be laid up with greater efficiency using simpler, less costly equipment. Another advantage is that the drive system used to rotate a mandrel on which the barrel section is laid up is smaller and may be arranged in-line with the mandrel. A further advantage is that automated laminators used to layup the barrel sections have a higher utilization rate. Another advantage is that the number and/or frequency of mandrel rotation may be reduced, thereby contributing to higher productivity. Furthermore, precise synchronization of mandrel rotation with laminator operation is not required. Still another advantage is that the drive system used to rotate the mandrel may be located entirely external of the mandrel, allowing greater flexibility in drive design. Another advantage is that the drive system may be more compactly configured to reduce floor space requirements and better facilitate movement of the mandrel along a production line into tight spaces such as into an autoclave.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
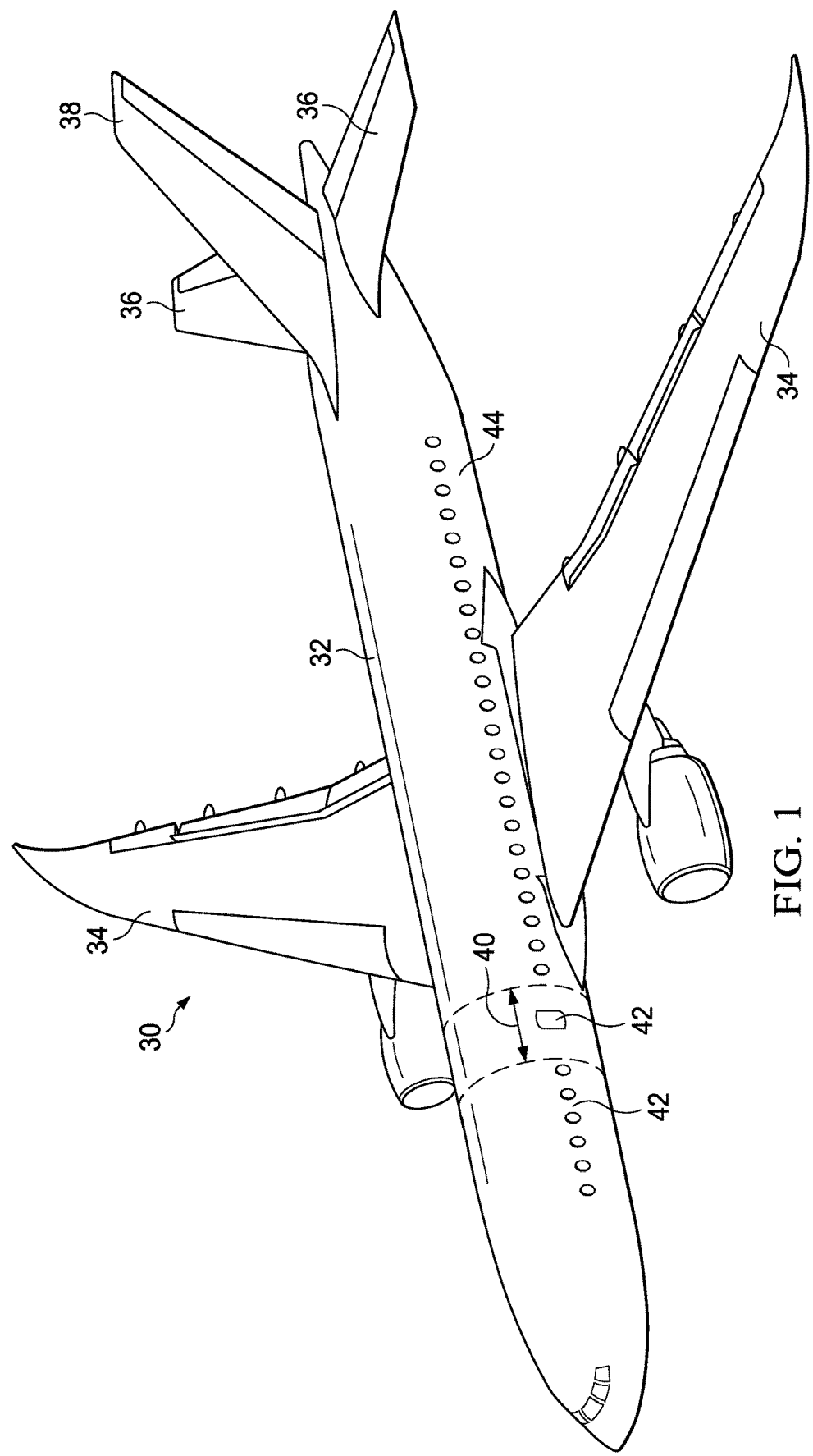
FIG. 1 is an illustration of a perspective view of an airplane.

Referring first to FIG. 1, an airplane 30 comprises a fuselage 32, wings 34, horizontal stabilizers 36 and a vertical stabilizer 38. In the illustrated example, the fuselage 32 is substantially cylindrical in cross-section, however in other examples it may be elliptical or have other similar shapes. The fuselage 32 is formed of composite components, including a composite outer skin 44 and typically may have numerous openings 42 therein, such as hatches or windows. The outer skin 44 is a composite laminate such as a carbon fiber reinforced polymer (CFRP).

Figure 2:
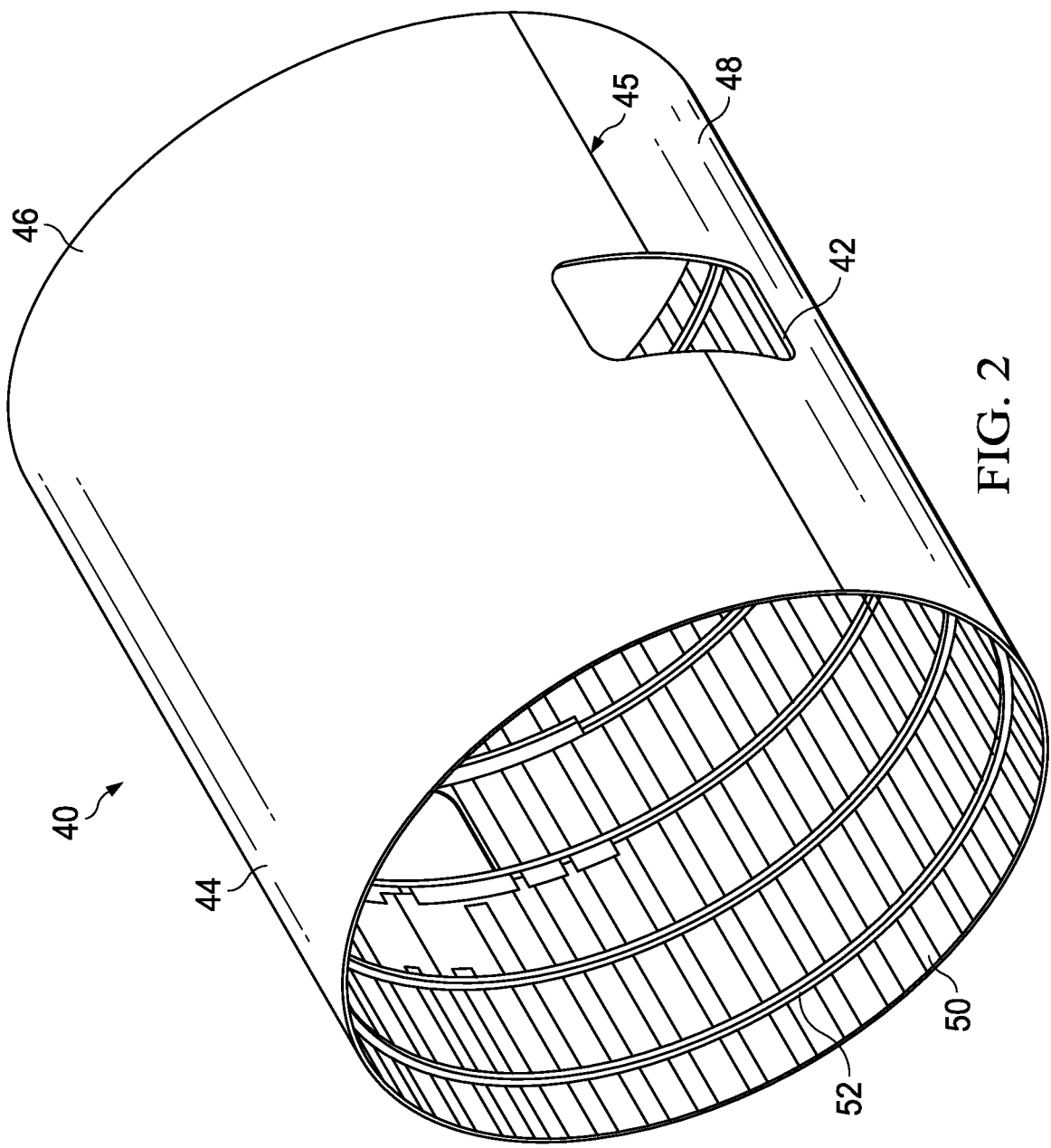
FIG. 2 is an illustration of a perspective view of a barrel section of the fuselage forming part of the airplane shown in FIG. 1.

As shown in FIG. 2, the fuselage 32 may comprise several composite barrel sections 40 that are joined together, end-to-end. Each of the barrel sections 40 comprises the outer composite skin 44, longitudinally extending stringers 50, and longitudinally spaced, circumferentially extending ribs 52. In the illustrated example, the outer composite skin 44 comprises an upper skin 46 and a lower skin 48 joined together along a belt line 45. However, in other examples, the outer skin 44 may comprise a single piece barrel.

Figure 3:
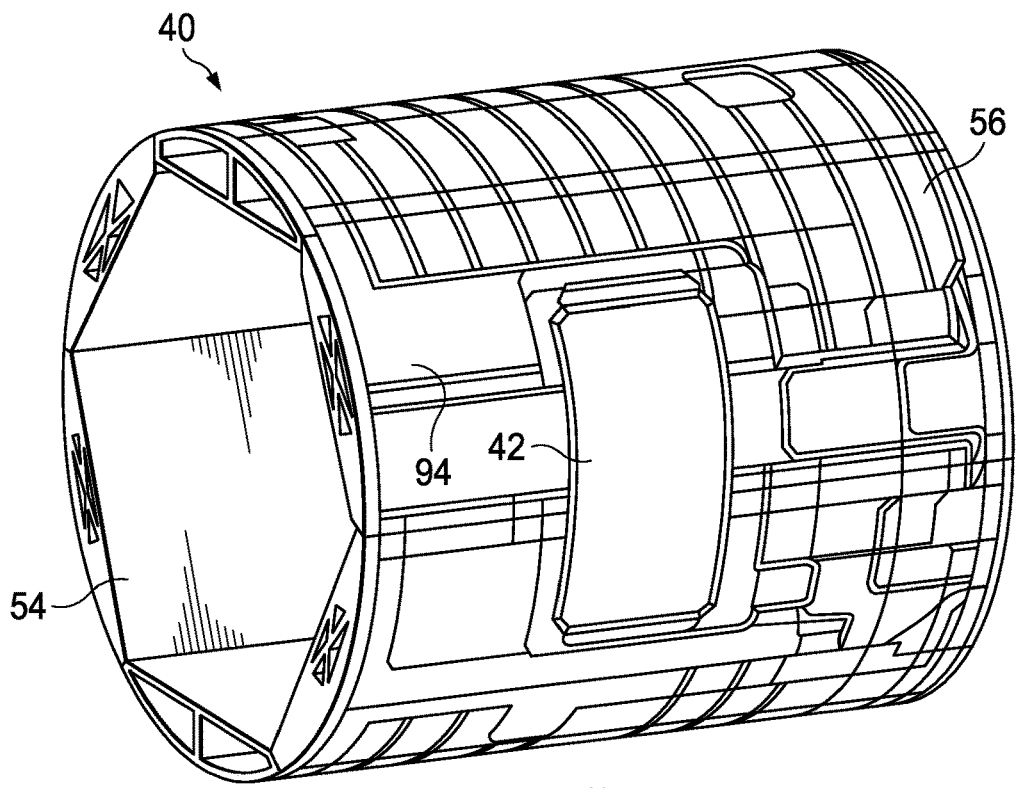
FIG. 3 is an illustration of a perspective view of a composite barrel section laid up on a mandrel.
Figure 4:
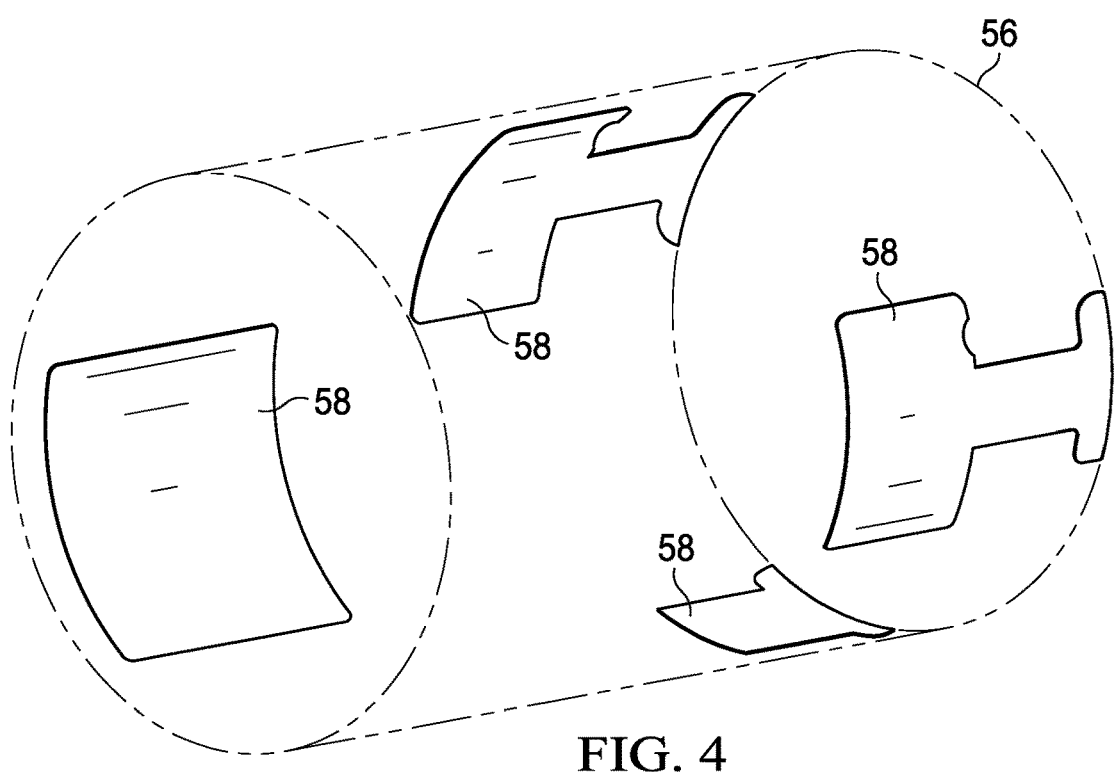
FIG. 4 is an illustration of a portion of the layup shown in FIG. 3, showing how a ply may comprise multiple separate ply segments.

Referring to FIGS. 3 and 4, the composite skin 44 comprises multiple plies 94 of composite material laid up on a barrel shaped mandrel 54 according to a predetermined ply schedule that may be unique to the particular application. Each of the plies 94 may comprise a full ply or, as shown in FIG. 4 may comprise one or more ply segments 58 forming local features such as, for example, doublers or tear straps.

Figure 5:
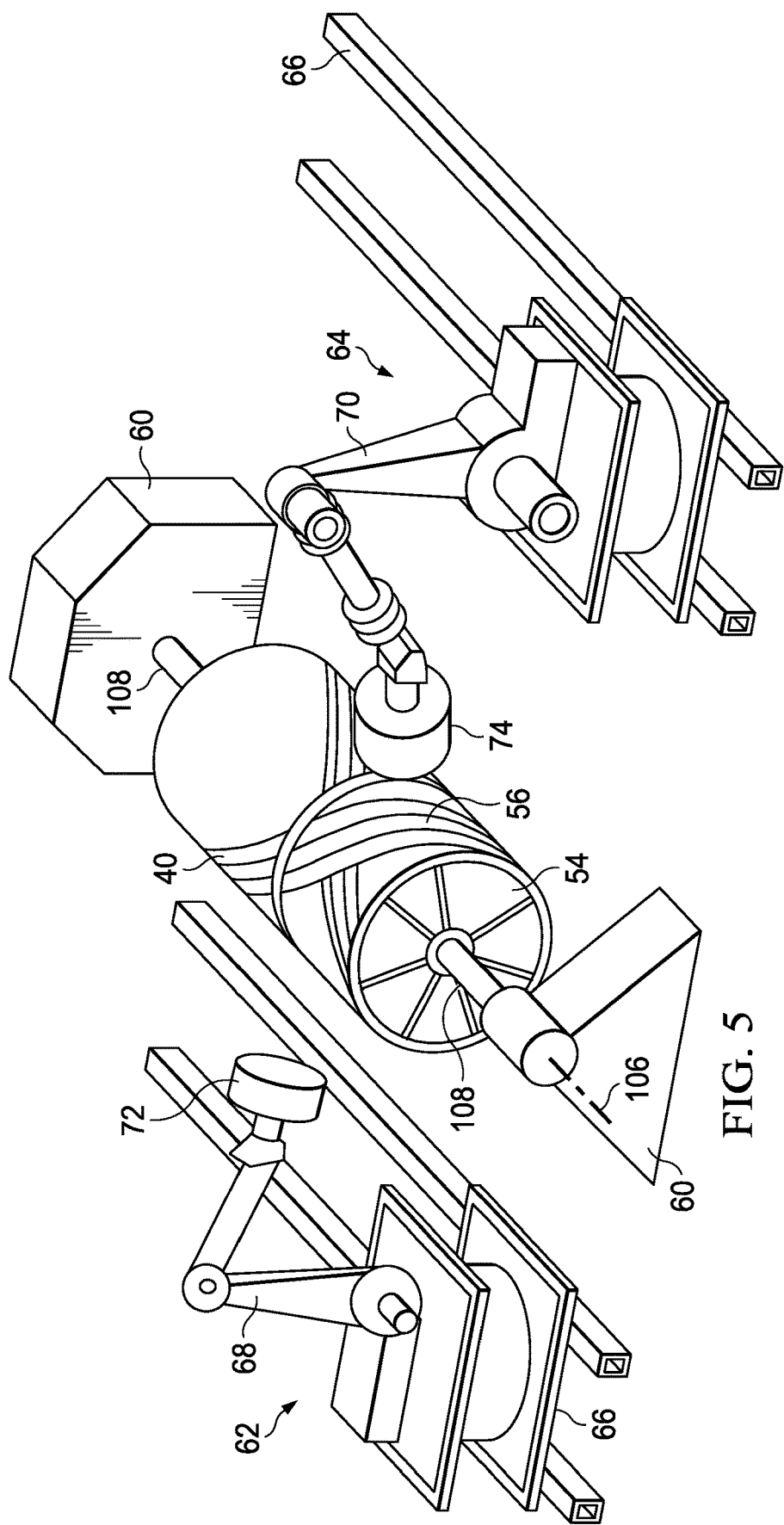
FIG. 5 is an illustration of a perspective view of apparatus for laying up a composite barrel section on the mandrel.

FIG. 5 illustrates apparatus for laying up the barrel section 40 on a mandrel 54. The mandrel 54 includes a pair of shafts 108 that mount the mandrel 54 for rotation on a pair of stanchions 60, one of which may include a later discussed drive, that rotates or "clocks" the mandrel 54 to one or more predetermined rotational positions. First and second laminators 62, 64 are respectively arranged on opposite sides of the mandrel 54, and are mounted for longitudinal movement along rails 66. Although in the illustrated example only two laminators, 62, 64 are employed, in other examples, it is possible to use more than two laminators. The laminators, 62, 64 comprise laminator heads 72, 74 operating as end effectors on articulated arm robots 68, 70. The use of other types of robotic manipulators is possible.

Figure 23:
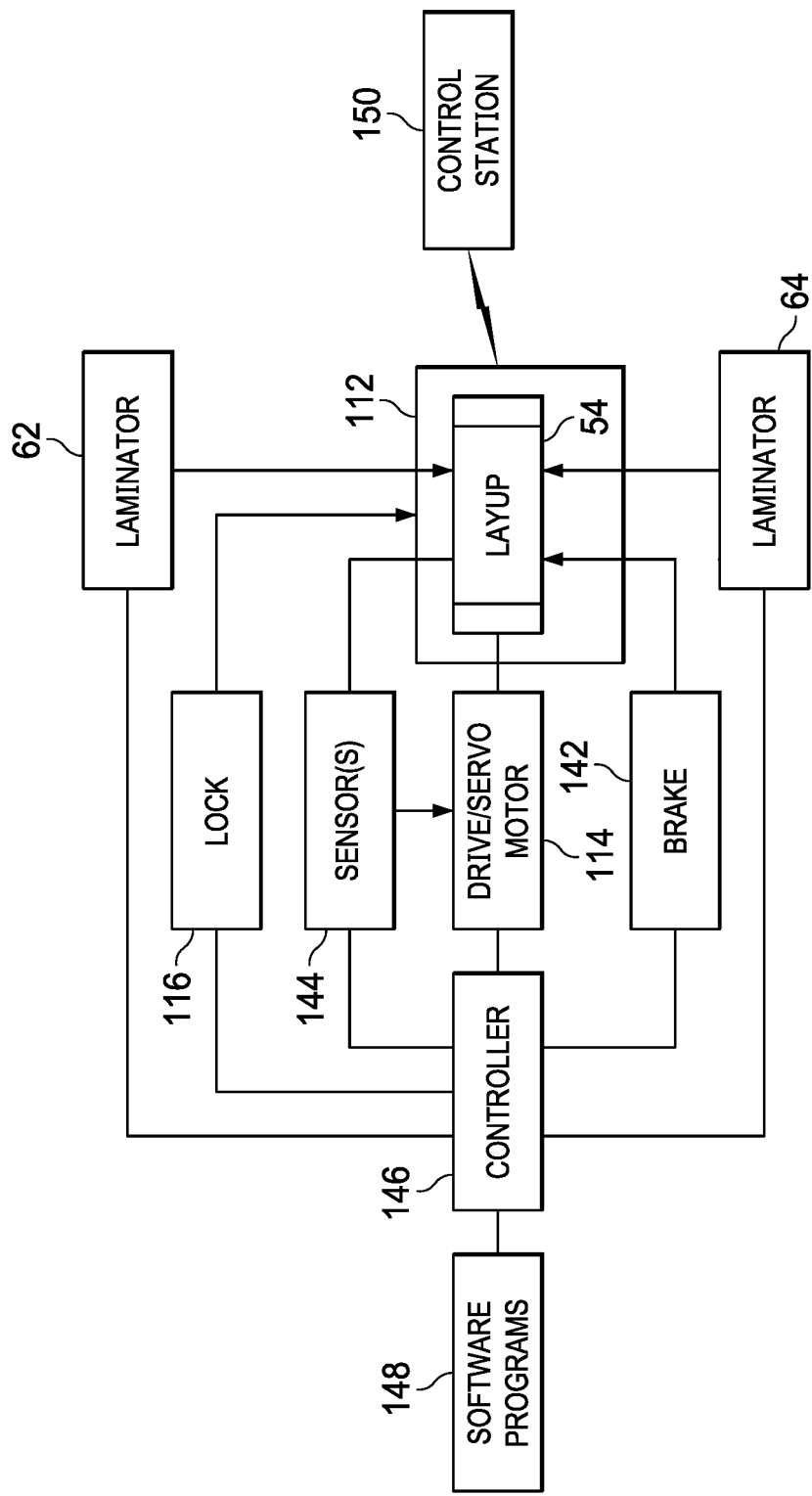
FIG. 23 is an illustration of a block diagram broadly showing the components of a system for laying up a composite barrel on a rotatable mandrel.

Each of the lamination heads 72, 74, is movable along multiple axes to allow placement of composite material at desired locations and in desired orientations on the mandrel 54. As used herein, the phrase "applying composite material on the mandrel 54" means applying the composite material directly on the mandrel 54 or on a ply of composite material that has already been laid up on the mandrel 54. As will be discussed later in more detail, operation of the robots 68, 70 as well as the laminator heads 72, 74 is controlled by one or more controllers, which may be NC (numerical control) or CNC (computer numerical control) controllers 146 (FIG. 23). The controller 146 controls and coordinates rotation of the mandrel 54, operation of the robots 68, 70, and operation of the lamination heads and 72, 74, in accordance with one or more sets of program instructions such as software programs (FIG. 23). The controller 146 controls the movement of the lamination heads 72, 74 over the mandrel 54 while the mandrel 54 remains stationary at preselected rotational positions. Each of the lamination heads 72, 74 may be of any several types that apply and compact composite tape or split tape on the mandrel 54.

Figure 6:
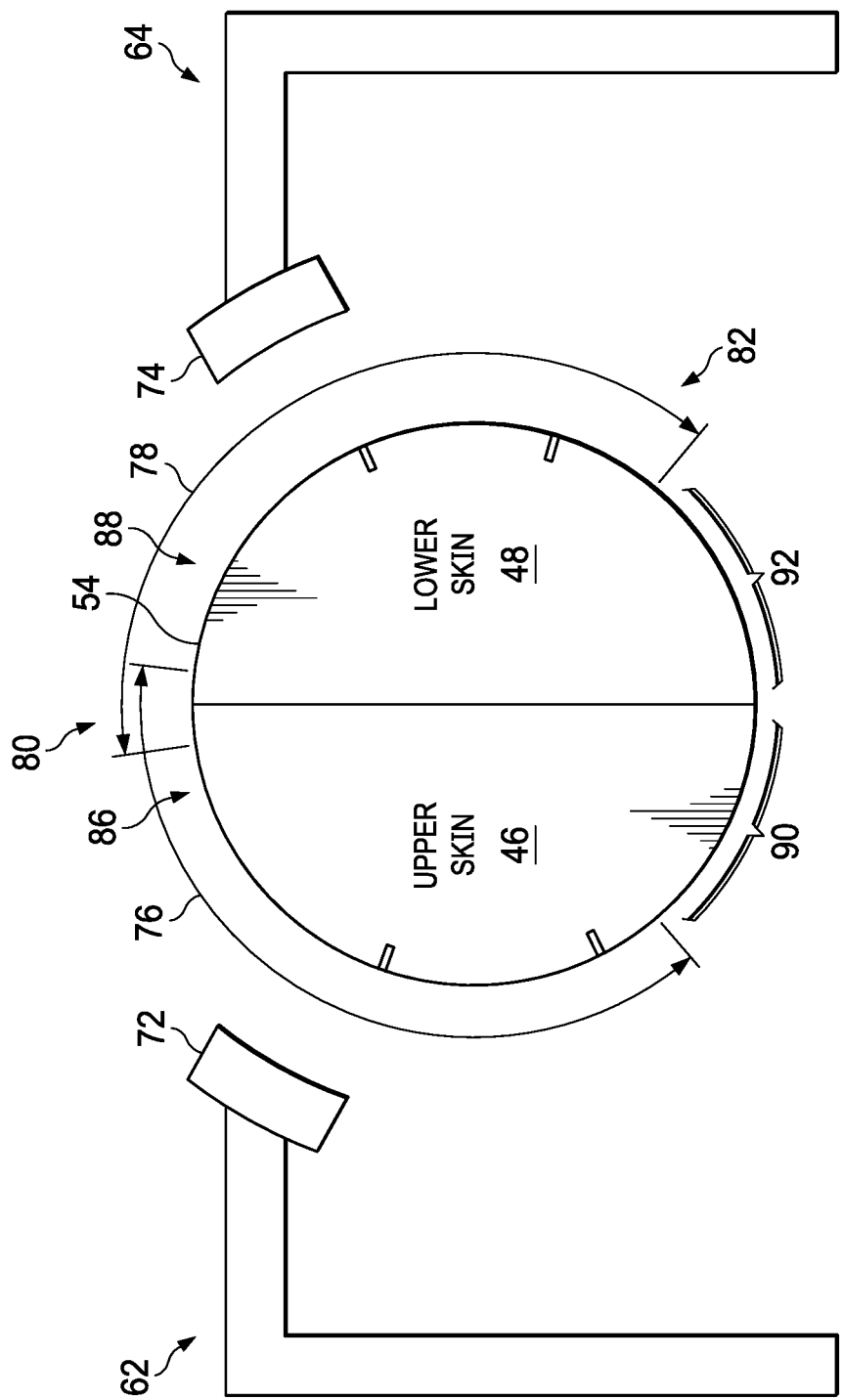
FIG. 6 is an illustration of a diagrammatic end view of a rotatable mandrel, showing the extent of reach of laminators flanking the mandrel, depicting the mandrel in a first position of rotation.
Figure 7:
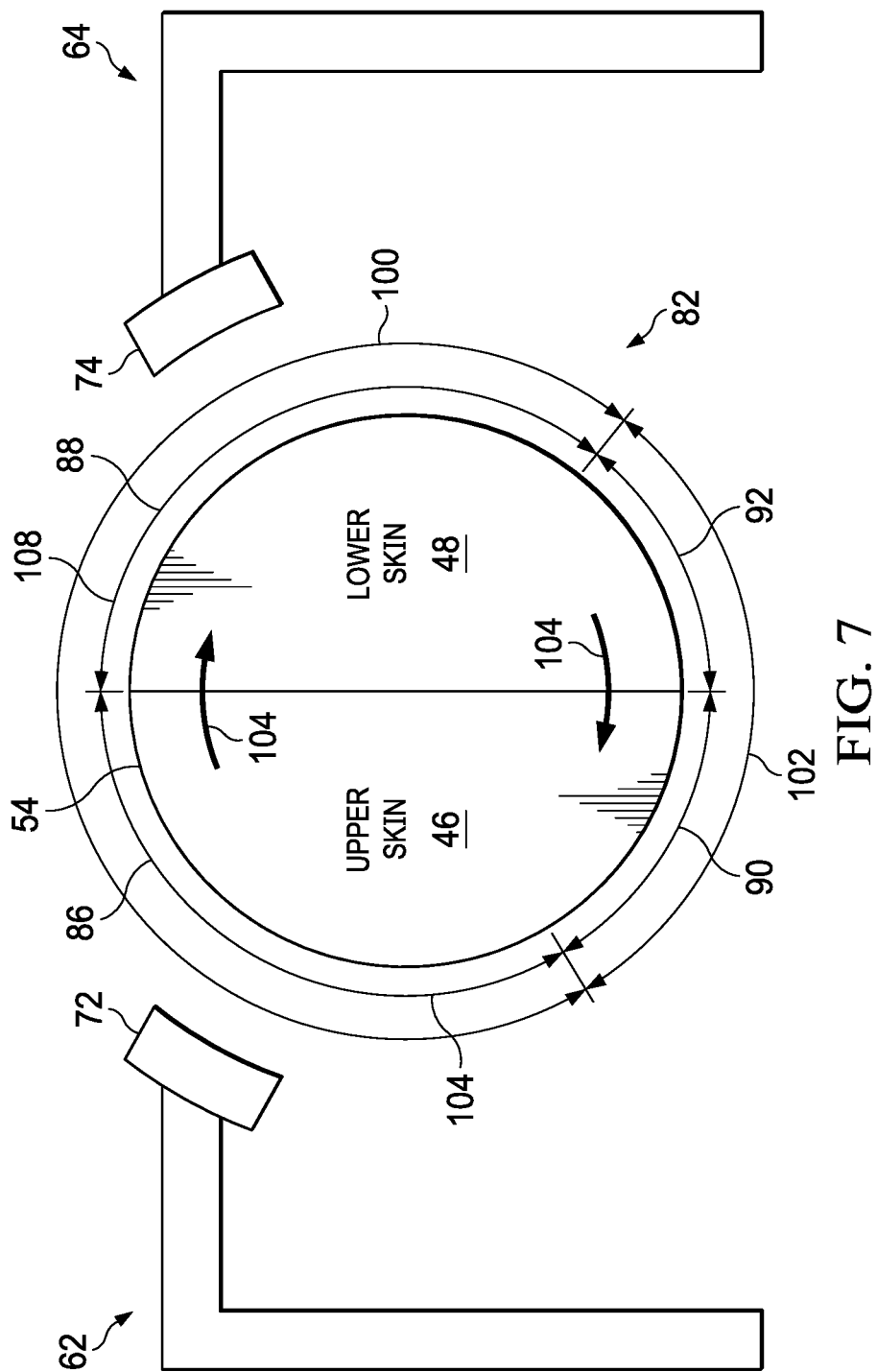
FIG. 7 is an illustration similar to FIG. 6, but showing how the circumference of the mandrel may be strategically divided up into regions and zones.

FIGS. 6 and 7 diagrammatically illustrate the mandrel 54 and the laminators, 62, 64, wherein the mandrel 54 is depicted in a first stationary position of rotation 82, which will hereinafter sometimes be referred to as "position A". For purposes of describing an example in which the barrel is a barrel section 40 of an aircraft fuselage, the mandrel 54 is divided into two 180 degree halves on which the upper and lower skins 46, 48 are laid up, respectively. The robots 68, 70 (FIG. 5), provide the laminator heads 72, 74 with circumferential ranges of motion or "reaches" 76, 78 respectively which, in the illustrated example, are each approximately 120 degrees, however other ranges are possible, including a range of greater than 180 degrees. Mounting of the robots 68, 70 on the rails 66 extends the circumferential reach 76, 78 of the lamination heads 72, 74 to the entire length of the mandrel 54. From FIG. 6, it can be seen that the two ranges of motion 76, 78 overlie each other at an overlap area 80 between the upper and lower skins 46, 48.

Referring to FIG. 7 lamination efficiency may be maximized using a lamination strategy that divides the circumference of the mandrel 54 into regions, and zones within each of the regions. In the illustrated example, when the mandrel 54 is in position A, the combined circumferential reach 76, 78 (FIG. 6) of the laminators 72, 74 covers a first region 100 of the mandrel 54. Laminator 72 has an individual reach 76 covering zone 86 within the region 100, and laminator 78 has an individual reach covering zone 88 within region 100. With the mandrel 54 remaining stationary in position A, the two laminators 72, 74 layup one or more plies respectively within the two zones 86, 88. As will be discussed below in more detail, multiple plies are laid up in each zone 86, 88 which may overlap each other within the overlap area 80.

After laying up the required number of plies in the first region 100, the mandrel 54 is rotated 180 degrees to a second rotational position sometimes referred to hereinafter as "position B", which results in a second region 102 being presented that is within the reach of the laminators 72, 74. The laminators 72, 74 then layup the required number of plies 94 respectively on two zones 90, 92 within region 102, thereby completing the skin layup 56. As will be discussed below, the plies 94 are laid up in the two (or more) regions 102, 104 in a manner to form joints 97 between the plies of the two regions 102, 104. The joints 97 are created by splices 98 between the plies 94 that are circumferentially offset from each other in order to maximize skin strength.

Figure 8:
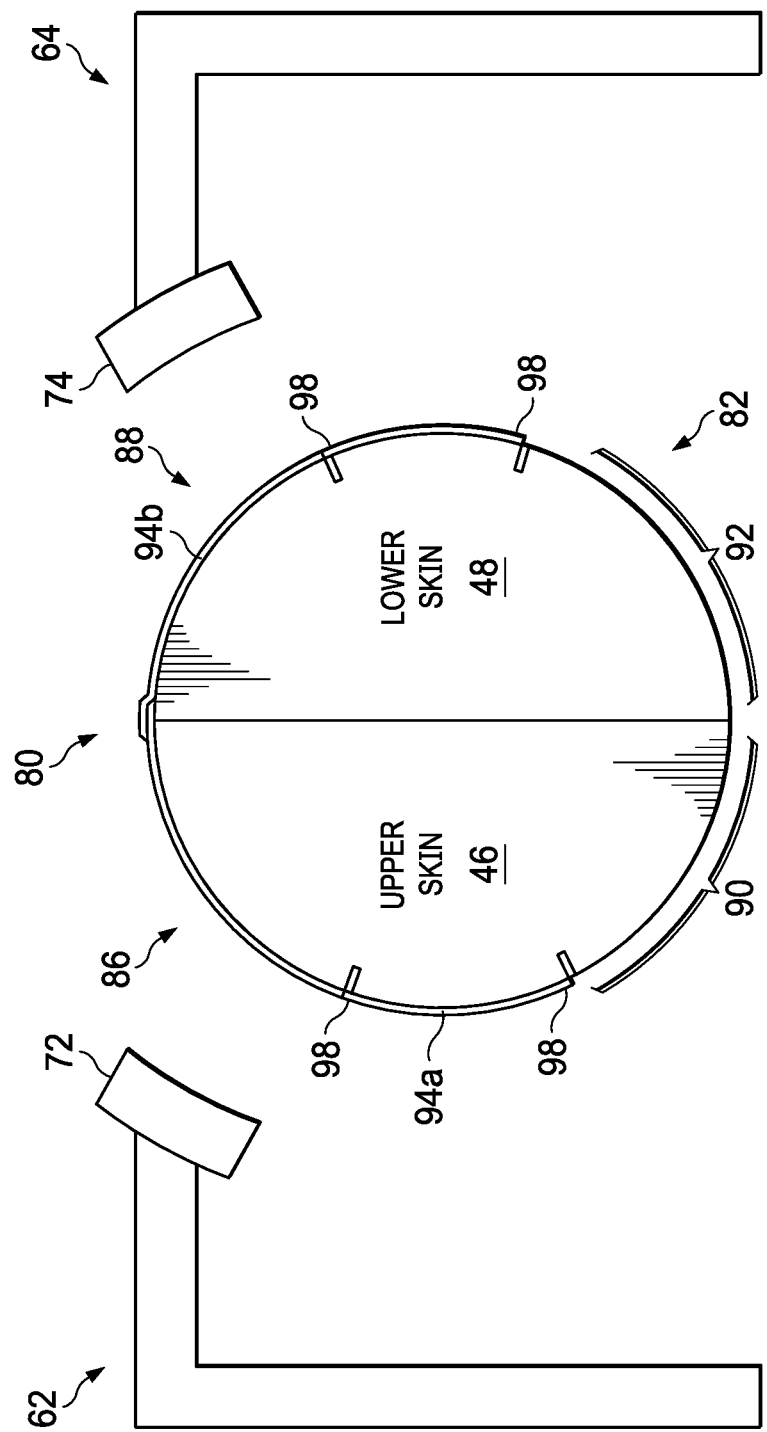
FIG. 8 is an illustration similar to FIGS. 6 and 7, showing a first layup sequence performed the while the mandrel is held stationary in a first rotational position.
Figure 13:
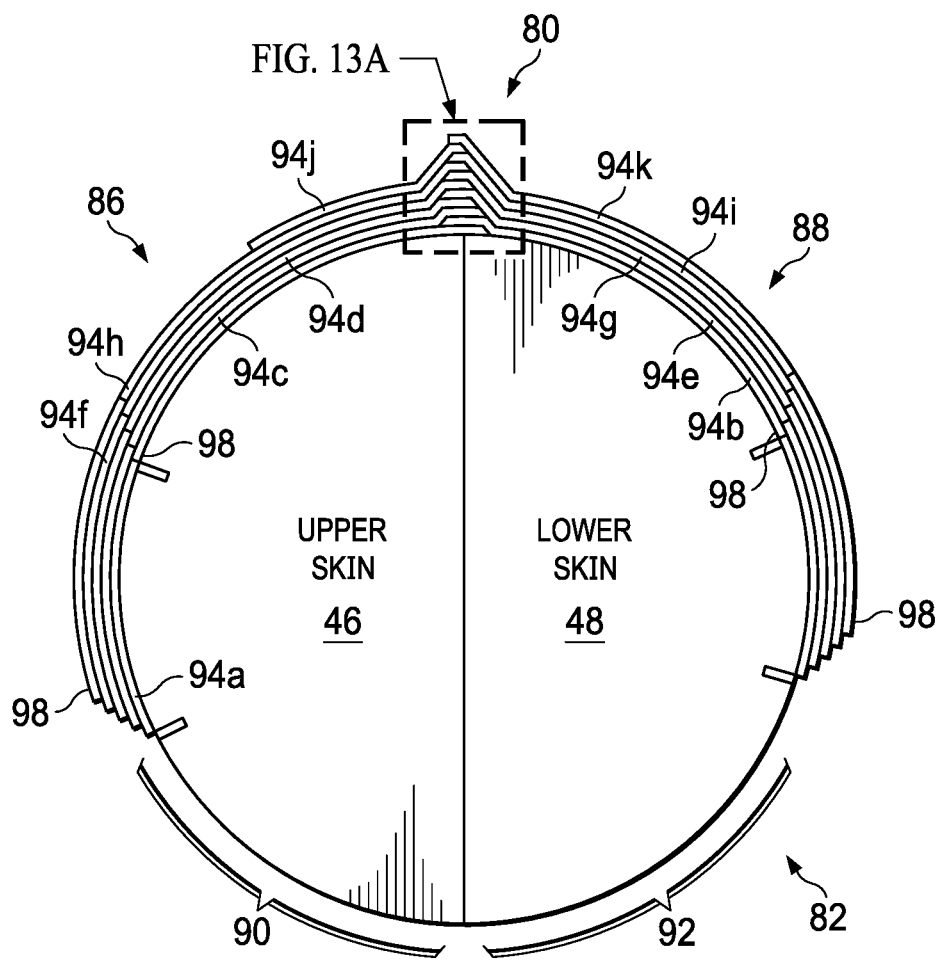
Figure 14A:
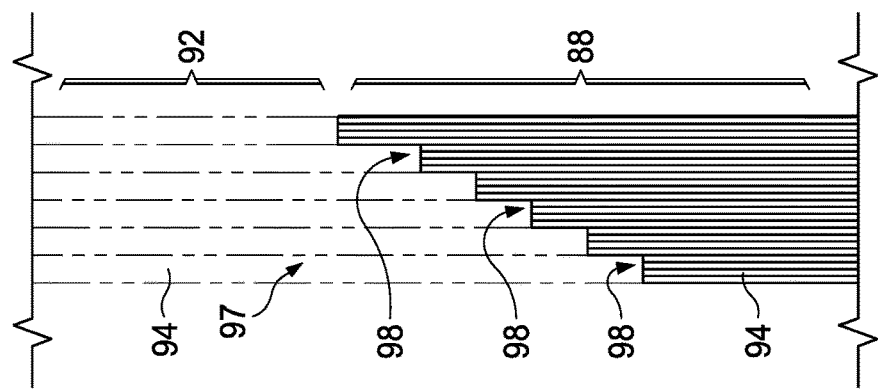
FIG. 14A is an illustration of the area designated as "FIG. 14A" in FIG. 14.
Figure 14:
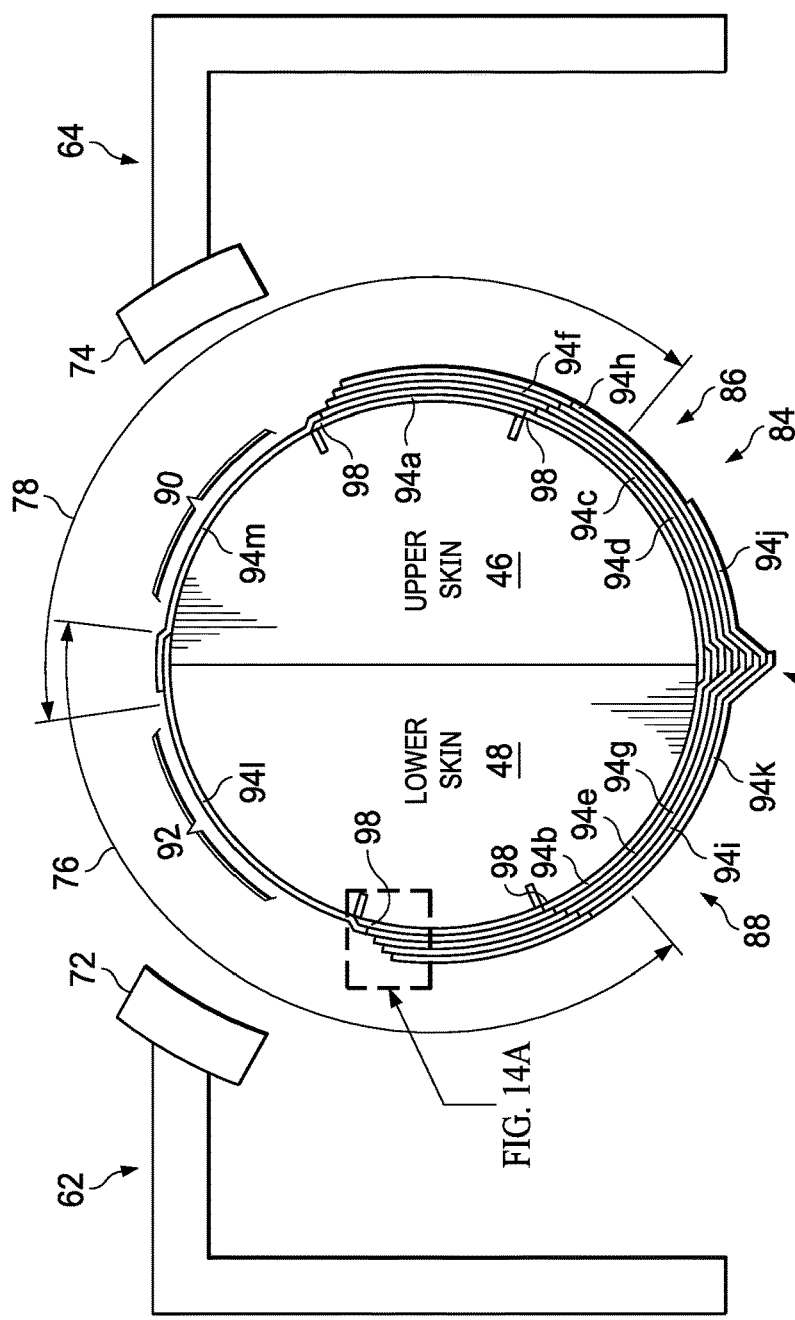
FIG. 14 is an illustration similar to FIG. 13, but wherein the mandrel has been rotated 180 degrees to a second rotational position thereof.

FIGS. 8-14A illustrate in more detail one example of layup sequences for laying up the composite barrel section 40 in which the plies 94 of the composite skin 44 are laid up on a mandrel 54 using two laminators 62, 64 as shown in FIG. 6. In this example, the mandrel 54 is rotated only once, 180 degrees from position A 82 (FIGS. 8-13) to position B 84 (FIG. 14). Referring to FIG. 8, with the mandrel 54 in position A, the laminators 62, 64 respectively layup plies 94a, 94b, which may overlay each other at the overlap area 80.

Figure 9:
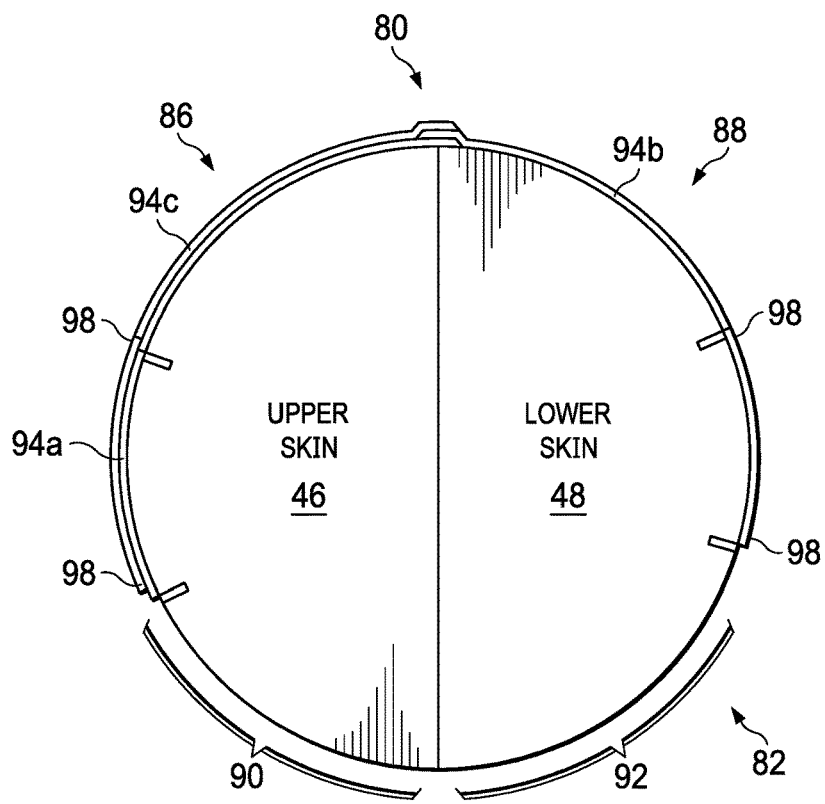
FIGS. 9-13 are illustrations similar to FIG. 8, showing additional layup sequences successively performed while the mandrel is in the first rotational position thereof, the laminators not shown for clarity.
Figure 10:
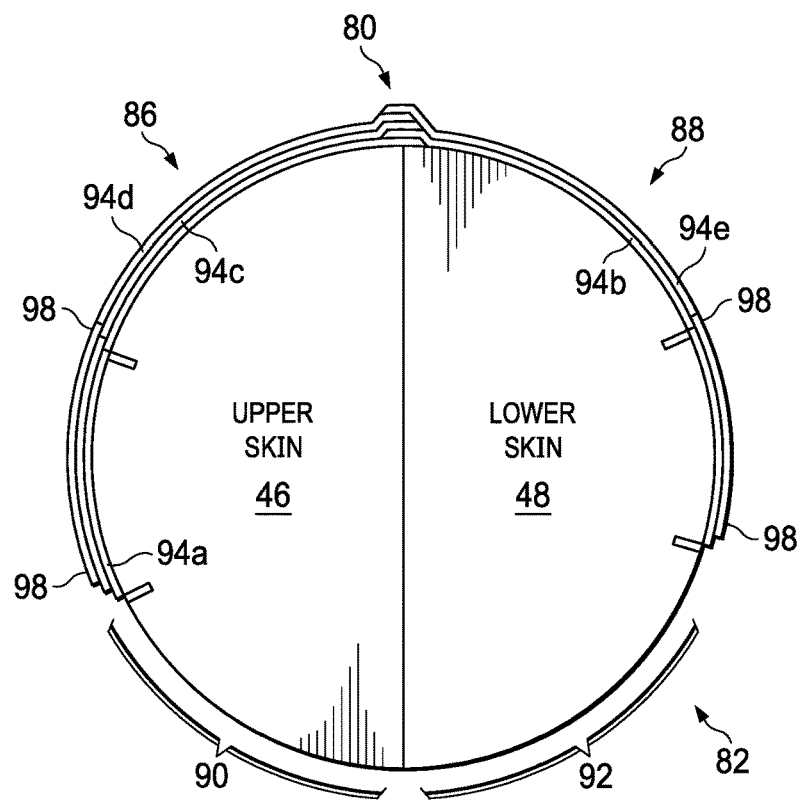
Figure 11:
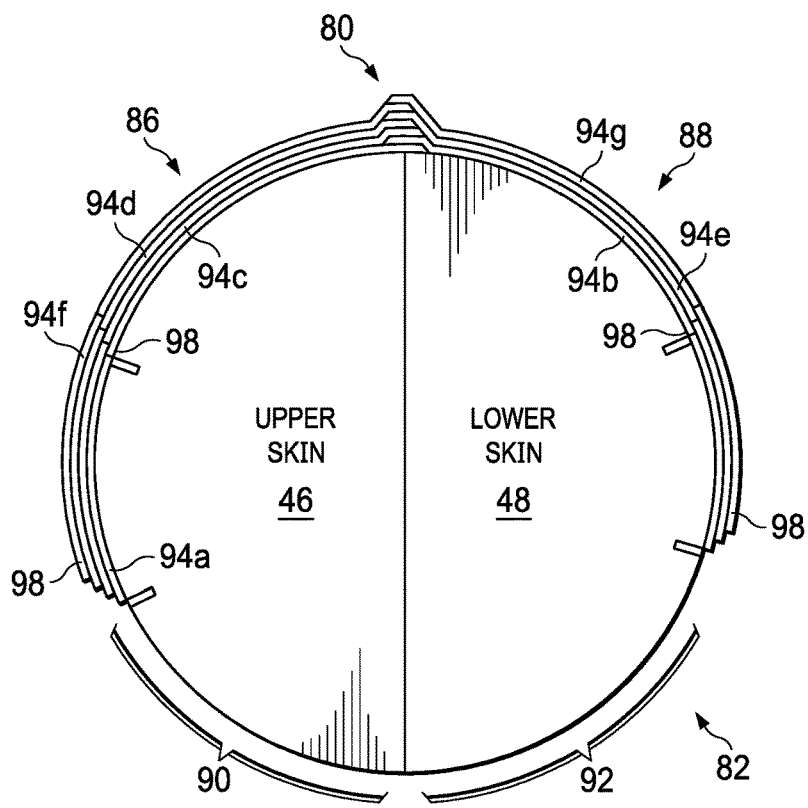
Figure 12:
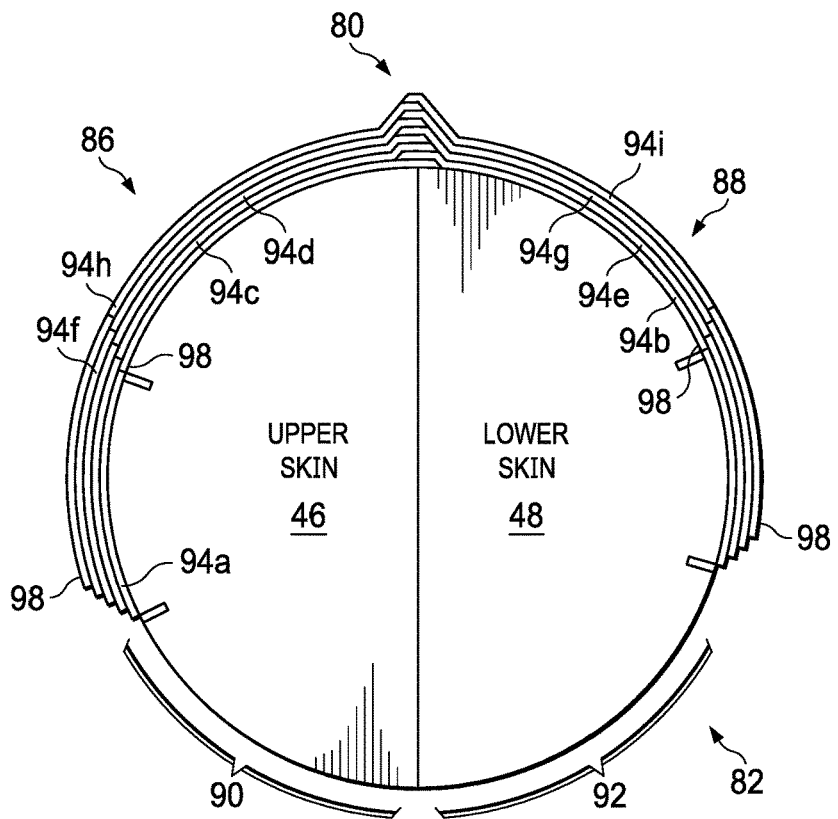
Figure 13A:
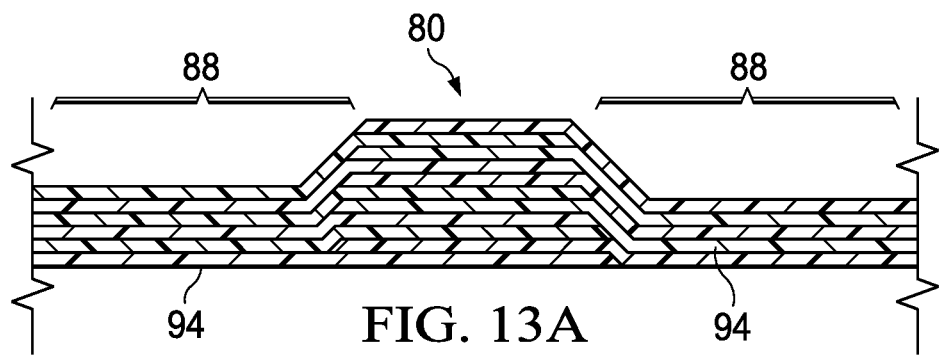
FIG. 13A is an illustration of the area designated as "FIG. 13A" in FIG. 13.

Next, in FIG. 9, laminator 62 lays up a second ply 94c over ply 94a, but no further plies are laid up by laminator 64 in this sequence. In the sequence shown in FIG. 10, plies 94d, 94e are respectively layup by laminators, 62, 64. Next, as shown in FIG. 11, two additional plies 94f, 94g are laid up by laminators 62, 64, and in the following sequence shown in FIG. 12, two further plies 94i, 94j are respectively laid up by laminators, 62, 64 over plies 94f, 94g. In FIG. 13 which shows the next layup sequence, a ply segment 94j is laid up by laminator 62, while a full ply 94k is laid up by laminator 64. Although the plies 94 within the two zones 86, 88 are shown as overlapping at the overlap 80 area (see FIG. 13A), in other examples, the plies from these two zones may form a butt joint (not shown). The plies 94 may be laid up such that their ends are staggered or offset in order to facilitate forming a joint 97 between the plies 94 in the first region 100 and the plies 94 in the second region 102. The process of laying up plies 94 on the mandrel 54 in successive sequences continues until all of the plies according to a desired ply schedule for the barrel section 40 within the first region 100 have been laid up.

Referring now to FIGS. 14 and 14A, after plies 94a-94k in the first region 100 (FIG. 7) of the mandrel 54 have been laid up, the mandrel 54 is rotated to position B, which in this example, comprises a 180 degree rotation. With the mandrel 54 in position B, the second region 102 of the mandrel 54 is presented within the reach of the laminators, 62, 64. Specifically, zone 92 is within the reach 76 of the laminator 72, and zone 90 is within the reach 78 of laminator 74. With the mandrel 54 held stationary in position B, plies are laid up in the second region 10 to complete the skin 44 which was partially laid up in region 100 as previously described. Each of the plies 94 laid up in the second region 102 may be an extension of a corresponding ply laid up in region 100. For example, as shown in FIG. 14, the laminators 72, 74 respectively layup plies 94l, 94m in zones 92, 90 overlapping the ends of plies 94a, 94b the in the first region 100 to form stair-step splices 98 (see FIG. 14A). In the example shown in FIG. 14A, the plies 94 in the splices 98 are offset from each other equal distances, however in other examples the offset distances may not be equal. In other examples, the joints 97 may be formed by overlapping some of the plies 96 in the two regions 100, 102.

As previously mentioned, the barrel section 40 may be a one piece structure, or may comprise two pieces, namely an upper skin 46 and a lower skin 48 (FIG. 2) that are joined together along a belt line 45. In one piece barrel section 40 examples, the layup 56 is removed from the mandrel 54 by disassembling or collapsing the mandrel 54. In two piece barrel section 40 examples, the two halves of the layup (upper and lower skins 46, 48) may be removed from the mandrel 54 by cutting through the layup 56 at the overlap areas 80, and then separating and removing the two halves from the mandrel 54. Alternatively, the mandrel 54 may be disassembled or collapsed, allowing removal of the one piece layup 56, following which the layup 56 may be cut into two halves at the overlap areas 80.

Figure 15:
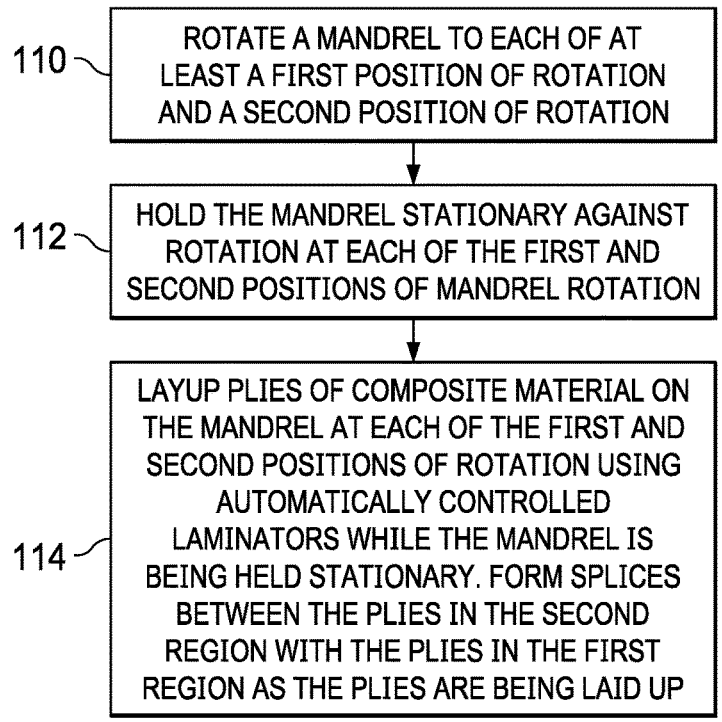
FIG. 15 is an illustration of a method of laying up a composite barrel on a rotatable mandrel.

Attention is now directed to FIG. 15, which broadly illustrates the steps of a method of laying up a composite barrel section 40 on a mandrel 54. Beginning at 110, a mandrel 54 is rotated to at least a first position of rotation 82 and a second position 84 of rotation. At 112, the mandrel 54 is held stationary against rotation at each of the first and second positions 82, 84 of mandrel rotation. At 114, plies 94 of composite material are laid up on the mandrel 54 in a first region of the mandrel while the mandrel is held stationary in the first position thereof, and plies of composite material are laid up in a second region of the mandrel while the mandrel is held stationary in the second position of rotation. Laying up the plies includes forming splices between the plies in the second region with the plies in the first region.

Figure 16:
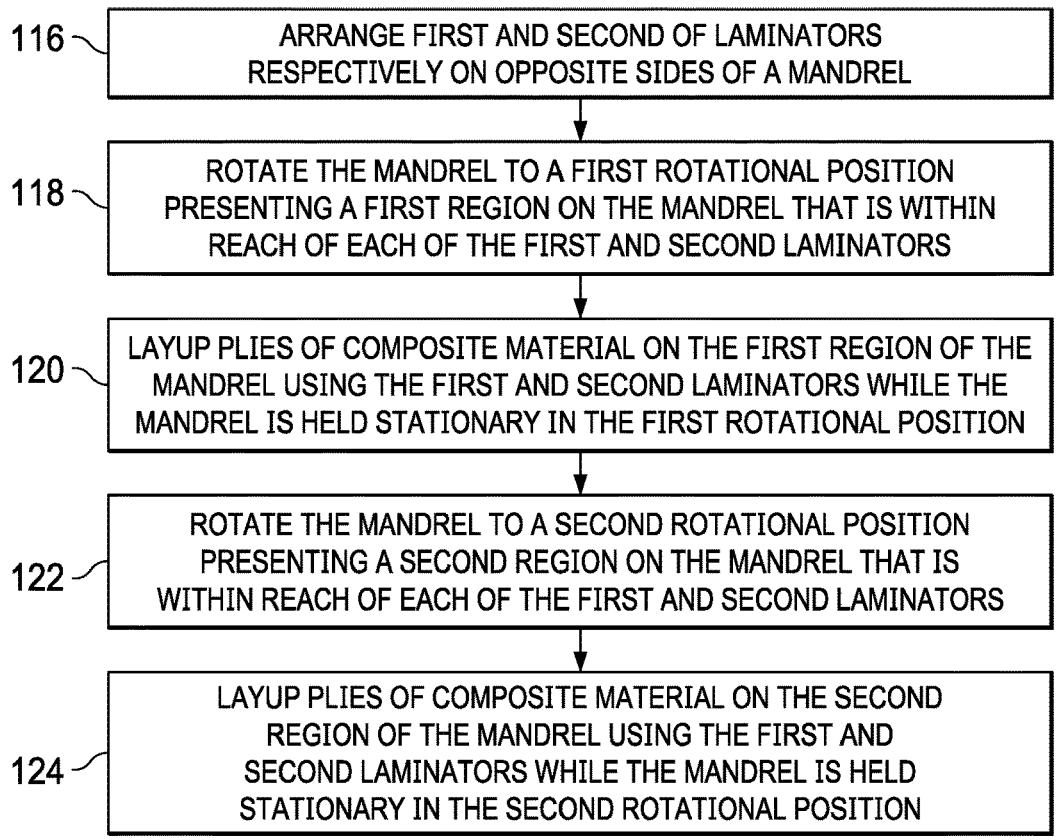
FIG. 16 is another illustration of a method of laying up a composite barrel on a rotatable mandrel.

FIG. 16 illustrates another method of laying up a composite barrel section 40 on a mandrel 54. At 116, first and second laminators 62, 64 are arranged respectively on opposite sides of a mandrel 54. At 118, the mandrel 54 is rotated to a first rotational position 82 presenting a first region 100 on the mandrel 54 that is within reach 76, 78 of each of the first and second laminators 62, 64. At 120, plies 94 of composite material are laid up on the first region 100 of the mandrel 54 using the first and second laminators 62, 64, while the mandrel 54 is held stationary in the first rotational position 82 thereof. At 122, the mandrel 54 is rotated to a second rotational position 84 presenting a second region 102 of the mandrel 54 that is within reach 76, 78 of each of the first and second laminators 62, 64. At 124, composite material is laid up on the second region 102 of the mandrel 54 using the first and second laminators 62, 64 while the mandrel 54 is held stationary in the second rotational position 84 thereof.

In the example described above, the mandrel 54 is rotated only once from position 82 to position 84. In other examples however, the mandrel 54 may be rotated multiple times to any of multiple stationary rotational positions in order to layup a barrel section 40, depending on the requirements of the particular ply schedule. In each example, however the mandrel 54 is held stationary at one of the rotational positions while the laminators 62, 64 layup plies in a region 100, 102 of the mandrel 54 that is within its reach 76, and the plies in the two regions are spliced together during the layup process. Thus, coordination of the movement of the laminator heads 72, 74 with simultaneous rotation of the mandrel 54 is not necessary. Moreover, the disclosed method results in reduction of the complexity of the equipment that is required to rotate the mandrel 54 since the mandrel 54 only need be rotated to preselected fixed rotational positions.

Figure 17:
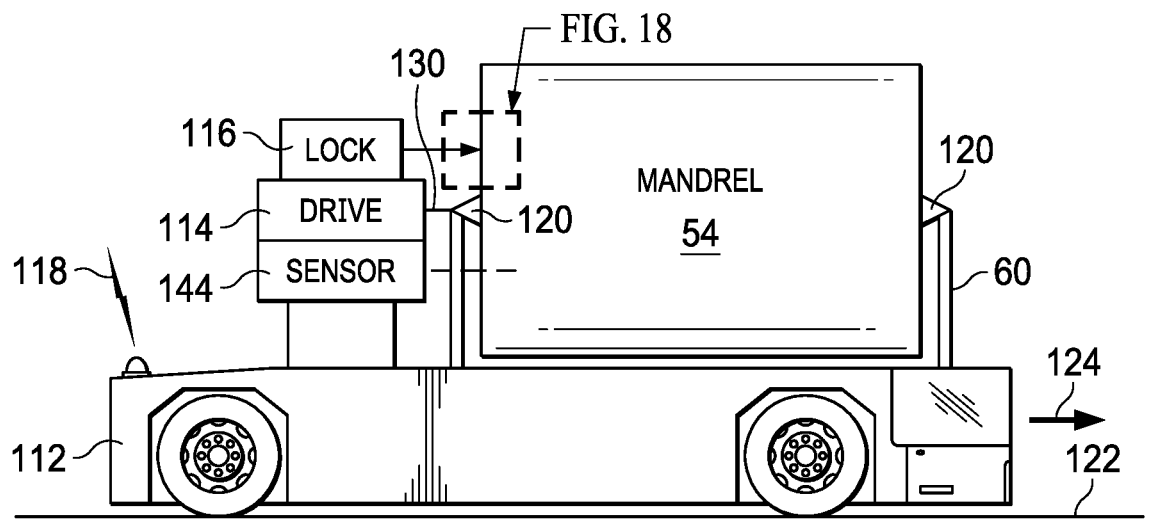
FIG. 17 is an illustration of a combined block and diagrammatic side view of a rotatable mandrel and associated drive mounted on an automatic guided vehicle.

Referring to FIG. 17, the mandrel 54 may be mounted for rotational movement using simple bearings 120 supported on stanchions 60 mounted on an automatic guided vehicle (AGV) or a similar vehicle 112 The vehicle 112 may transport the mandrel 54 in any desired direction 124 along a surface 122 such as a factory floor. The mandrel 54 is rotated by any suitable drive 114, such as a servo motor. Although not shown in FIG. 17, the servo motor includes an electric motor operated by a control circuit and has an output drive shaft 130 connected to the mandrel 54. Although not shown in the drawings, the drive 114 may include suitable reduction gearing and/or other transmission components.

Figure 18:
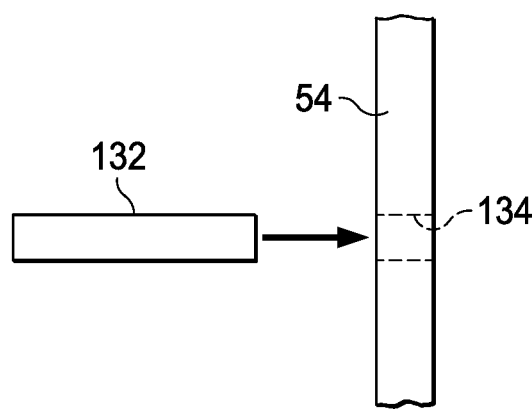
FIG. 18 is an illustration of a diagrammatic view of a portion of a locking mechanism, showing a locking pin in a released position.
Figure 19:
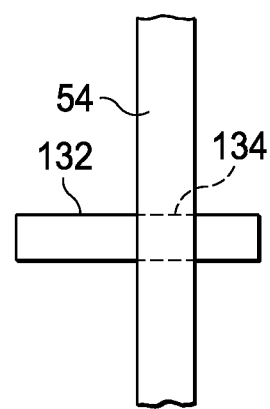
FIG. 19 is an illustration similar to FIG. 18, but showing the locking pin in a locking position.
Figure 20:
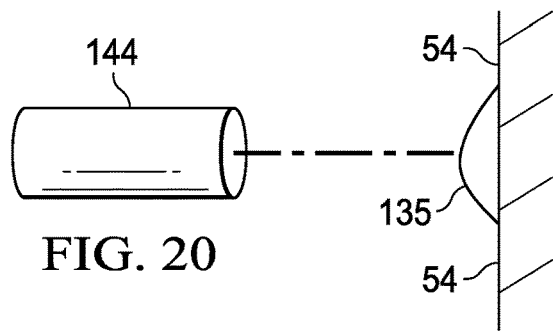
FIG. 20 is an illustration of a diagrammatic view showing a position sensor in relation to a feature on the mandrel or on the layup.
Figure 22:
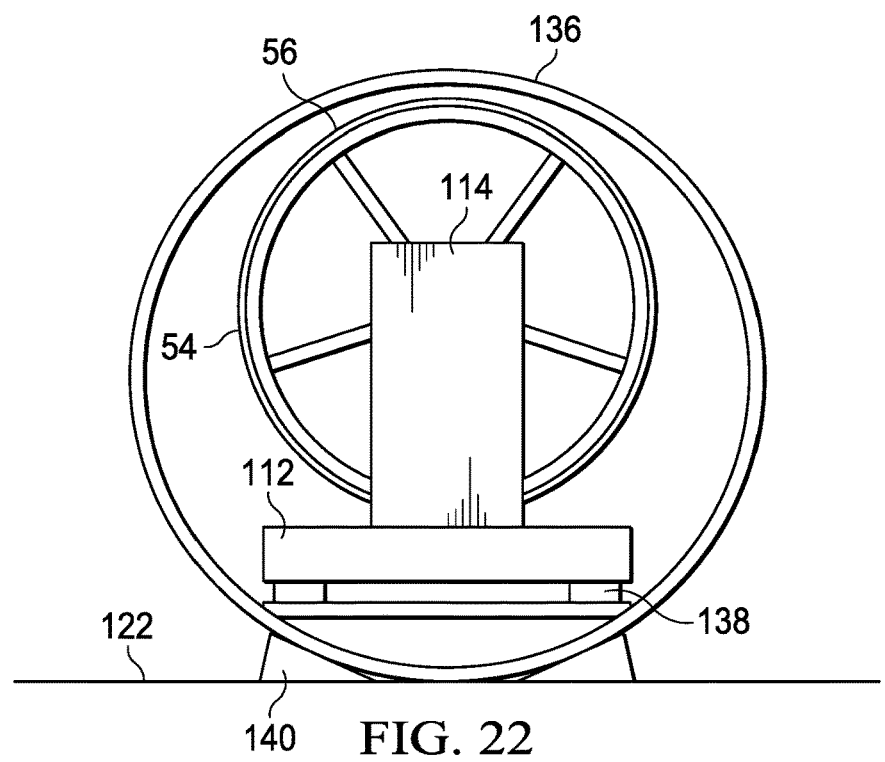
FIG. 22 is an illustration of a diagrammatic end view of the mandrel shown in FIG. 21 having been towed into an autoclave.

The drive 114 is located outside of the mandrel 54 and may be arranged in-line with the mandrel 54, resulting in a narrow profile that permits the AGV 112 to transport the mandrel 54 through narrow spaces, such as into an autoclave 136 (FIG. 22). Depending on the size of the mandrel 54 and the type of drive 114 that is used, a locking mechanism 116 may be employed to lock the mandrel 54 in desired rotational positions before lamination operations are performed. In one example, as shown in FIGS. 18 and 19, the locking mechanism may comprise a simple locking pin 132 that is shifted into an opening 134 in a portion of the mandrel 54. In other examples, the locking mechanism 116 may be an electronic circuit (not shown) that is integrated into the servo motor forming part of the drive 114 in order to precisely position and fix the mandrel 54 in desired rotational positions. Referring also to FIG. 20, one or more sensors 144 may be provided for sensing one or more features 135, either on the mandrel 54, or on the layup 56 in order to locate the mandrel 54, the layup 56 and the laminators 62, 64 within a common coordinate system.

Figure 21:
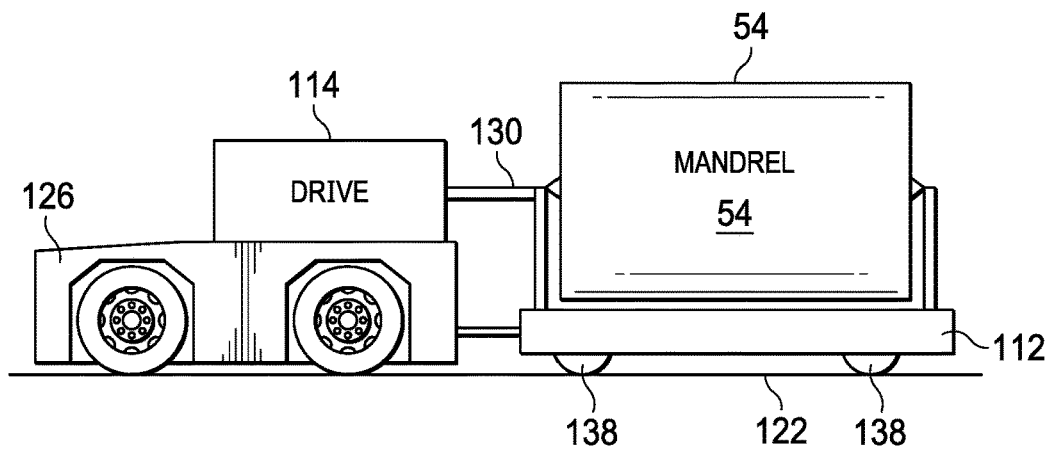
FIG. 21 is an illustration of a combined block and diagrammatic side view of a rotatable mandrel mounted on a mobile platform coupled with a tug.

Referring to FIG. 21, the mandrel 54 may be mounted on a non-powered mobile platform 112 having wheels 138 that allow the mobile platform 112 to be pushed or pulled by a tug 126 or similar powered vehicle over a surface 122. In this example, the drive 114 is mounted on the top of the tug 126 and rotates the mandrel 54 through a driveshaft 130.

Attention is now directed to FIG. 22, which illustrates an autoclave 136 for curing the layup 56 on the mandrel 54. In this example, the mandrel 54 as well as the drive 114 are mounted on a mobile platform 112 similar to that shown in FIGS. 17 and 21. Because the drive 114 is aligned with the mandrel 54, the combination of the mandrel 54 and drive 131 present a narrow profile that allow them to be towed or pushed together along a production line (not shown) into the autoclave 136.

FIG. 23 broadly illustrates the operating and control components of a system for laying up a composite barrel section 40 on a mandrel 54. In this example, the barrel section 40 is laid up on a mandrel 54 that is mounted on a mobile platform 112. Laminators 62, 64 arranged on opposite sides of the mandrel 54 are operated by the controller 146 which, as previously described, may be an NC or CNC controller employing one or more software programs 148. The controller 146 also controls the drive 114, and optionally, a lock 116 and a brake 142. As previously mentioned, the lock 116 may be in an electronic device forming part of the servo motor. Depending on the application, the mandrel 54 may have a relatively large mass which may make slowing the rotation of the mandrel 54 challenging. Accordingly, a mechanical or electronic brake 142 is provided for slowing rotation of the mandrel 54, as necessary. Slowing rotation of the mandrel 54 may be necessary in order to permit precisely locating the mandrel at a desired rotational position. In those examples where the mobile platform 112 is an AGV, a control station 150 may be provided to wirelessly control operation of the AGV as well as the controller 146.

Figure 24:
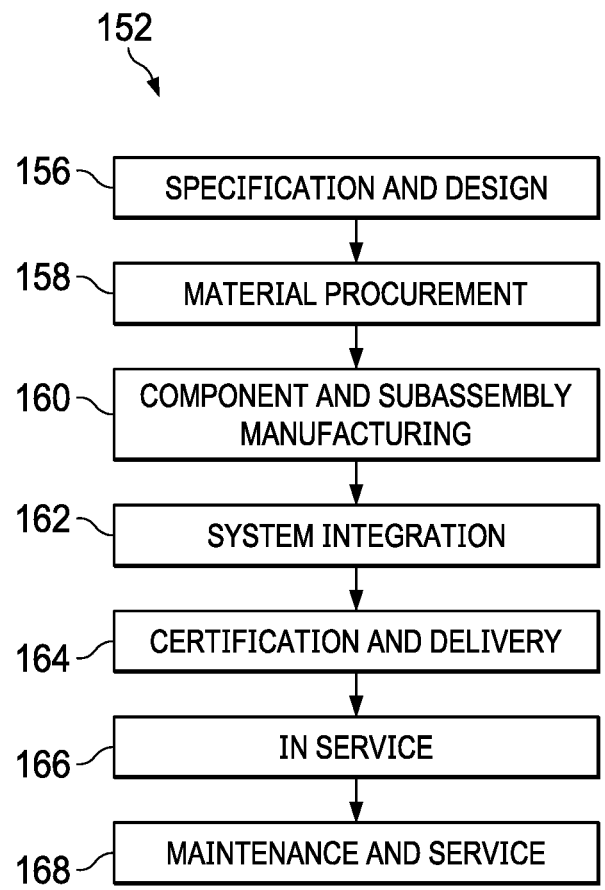
FIG. 24 is an illustration of a flow diagram of aircraft production and service methodology.
Figure 25:
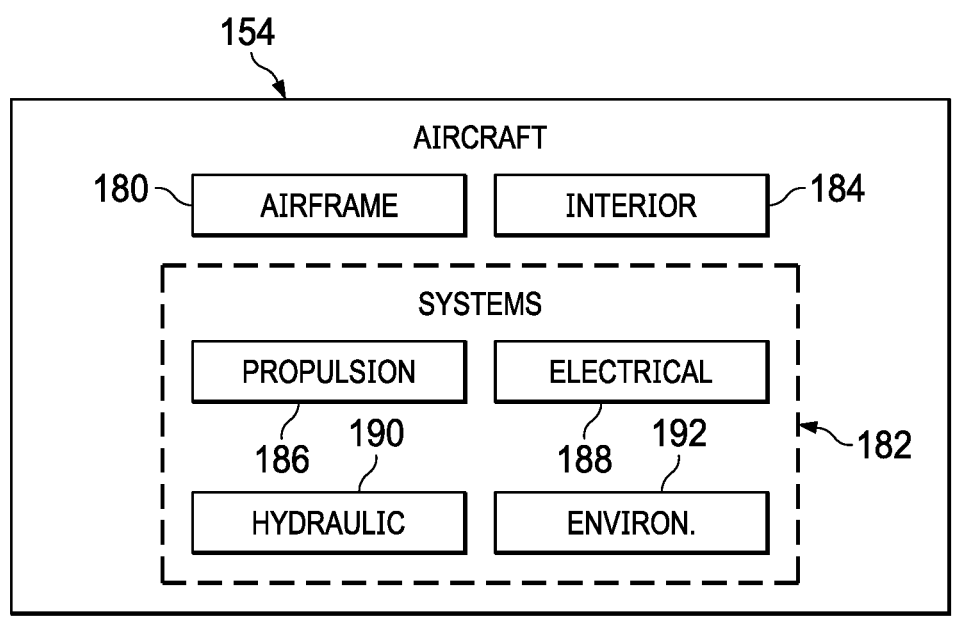
FIG. 25 is an illustration of a block diagram of an aircraft.

Examples of the disclosure may find use in a variety of potential applications, particularly in the transportation industry, including for example, aerospace, marine, automotive applications and other application where composite barrel shaped structures may be used. Thus, referring now to FIGS. 24 and 25, examples of the disclosure may be used in the context of an aircraft manufacturing and service method 152 as shown in FIG. 24 and an aircraft 154 as shown in FIG. 25. Aircraft applications of the disclosed examples may include a variety of barrel shaped structures such as a fuselage. During pre-production, exemplary method 152 may include specification and design 156 of the aircraft 154 and material procurement 158. During production, component and subassembly manufacturing 160 and system integration 162 of the aircraft 154 takes place. Thereafter, the aircraft 154 may go through certification and delivery 164 in order to be placed in service 166. While in service by a customer, the aircraft 154 is scheduled for routine maintenance and service 168, which may also include modification, reconfiguration, refurbishment, and so on.

Each of the processes of method 152 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 154 produced by exemplary method 152 may include an airframe 180 with a plurality of systems 182 and an interior 184. Examples of high-level systems 182 include one or more of a propulsion system 186, an electrical system 188, a hydraulic system 190 and an environmental system 192. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 152. For example, components or subassemblies corresponding to production process 160 may be fabricated or manufactured in a manner similar to components or subassemblies produced while the aircraft 154 is in service. Also, one or more apparatus examples, method examples, or a combination thereof may be utilized during the production processes 160 and 162, for example, by substantially expediting assembly of or reducing the cost of an aircraft 154. Similarly, one or more of apparatus examples, method examples, or a combination thereof may be utilized while the aircraft for is in service, for example and without limitation, to maintenance and service 168.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of laying up a composite barrel on a mandrel, comprising:
   rotating the mandrel to each of at least first and second positions of rotation;
   holding the mandrel stationary against rotation at each of the at least first and second positions of rotation;
   laying up plies of composite material in a first region of the mandrel in successive sequences while the mandrel is held stationary at the first position of rotation; and
   laying up plies of composite material in a second region of the mandrel in successive sequences while the mandrel is held stationary at the second position of rotation, including forming splices between the plies in the second region with the plies in the first region,
   wherein laying up plies of composite material includes overlapping the plies within one of the first and second regions of the mandrel and between two zones.

2. The method of claim 1, wherein forming splices includes offsetting the splices from each other.

3. The method of claim 1, wherein laying up plies of composite material is performed using automatically controlled laminators each having a lamination head and circumferential reach, including moving the lamination heads over the mandrel as the mandrel is held stationary at each of the first and second positions of rotation.

4. The method of claim 3, wherein laying up the plies includes arranging first and second automatically controlled laminators respectively on opposite sides of the mandrel such that the laminators have a combined reach extending over the first region of the mandrel when the mandrel is in the first position of rotation, and a combined reach extending over the second region of the mandrel when the mandrel is in the second position of rotation.

5. The method of claim 4, wherein laying up the plies includes:
   using the first laminator to lay up plies within a first zone within the first region; and
   simultaneously, using the second laminator to lay up plies in a second zone within the first region.

6. The method of claim 1, further comprising:
   braking the rotation of the mandrel as the mandrel is rotated to each of the at least first and second positions of mandrel rotation; and
   locking the mandrel in each of the first and second positions of rotation.

7. The method of claim 1, wherein rotating the mandrel from the first position of rotation to the second position of rotation includes rotating the mandrel 180 degrees.

8. A method of laying up a composite barrel on a mandrel, comprising:
   arranging first and second laminators respectively on opposite sides of the mandrel;
   rotating the mandrel to a first rotational position of the mandrel presenting first and second zones on the mandrel that are respectively within circumferential reach of the first and second laminators;
   holding the mandrel stationary against rotation in the first rotational position;
   laying up plies of composite material on the mandrel in successive sequences in at least one of the first and second zones of the mandrel using the first and second laminators respectively while the mandrel is held stationary in the first rotational position thereof;
   rotating the mandrel to a second rotational position of the mandrel presenting third and fourth zones on the mandrel that are respectively within circumferential reach of each of the first and second laminators;
   holding the mandrel stationary against rotation in the second rotational position; and
   laying up plies of composite material on the mandrel in successive sequences in at least one of the third and fourth zones of the mandrel using the first and second laminators respectively while the mandrel is held stationary in the second rotational position thereof;
   wherein laying up the plies includes overlapping the plies between at least two of the zones and within a region.

9. The method of claim 8, wherein laying up the plies includes:
   forming splices between the plies of the zones; and
   offsetting the splices from each other.

10. The method of claim 8, wherein rotating the mandrel to the second rotational position thereof includes rotating the mandrel 180 degrees from the first rotational position of the mandrel.

11. The method of claim 8, wherein rotating the mandrel is performed using a drive located outside of the mandrel.

12. The method of claim 8, further comprising:
locating a reference feature on the mandrel while the mandrel is stationary in each of the at least first and second rotational positions thereof; and
using the reference feature to lay up plies at desired locations on the mandrel.

13. A system for laying up a composite barrel, comprising:
a mandrel configured to be rotated about a central axis, the mandrel being generally cylindrical;
first and second laminators respectively arranged on opposite sides of the mandrel, each of the first and second laminators having a circumferential reach and including a lamination head configured to apply plies of composite material on the mandrel in successive sequences within its circumferential reach while the mandrel is held stationary;
a drive configured to rotate the mandrel about the central axis to at least first and second rotational positions, and hold the mandrel stationary at each of the first and second rotational positions; and
a controller configured to control operation of the drive, and operation of the first and second laminators such that lamination heads move over the mandrel and apply the plies of composite material on the mandrel at a same time as the mandrel remains stationary at each of the first and second rotational positions thereof and overlap plies of composite material within a region of the mandrel and between two zones of the mandrel.

14. The system of claim 13, wherein the drive is located outside of the mandrel, and is generally aligned with the central axis of the mandrel.

15. The system of claim 13, wherein the drive includes a servo motor configured to rotate the mandrel to each of the first and second rotational positions thereof.

16. The system of claim 13, further comprising:
a sensor configured to sense the rotational position of the mandrel; and
a lock configured to lock the mandrel against rotation when the mandrel has been rotated to each of the first and second rotational positions thereof.

17. The system of claim 13, further comprising:
a brake coupled with the mandrel for slowing and stopping rotation of the mandrel at each of the first and second rotational positions thereof.

18. The system of claim 13, further comprising:
a mobile platform configured to move over a surface; and
a drive for rotating the mandrel,
wherein the mandrel and the drive are mounted on the mobile platform for movement along the surface.

19. The system of claim 13,
wherein the drive is located outside of the mandrel, and is generally aligned with the central axis of the mandrel and
wherein the drive includes a servo motor configured to rotate the mandrel to each of the first and second rotational positions thereof.

20. The system of claim 13, further comprising:
a sensor configured to sense the rotational position of the mandrel;
a lock configured to lock the mandrel against rotation when the mandrel has been rotated to each of the first and second rotational positions thereof; and
a brake coupled with the mandrel for slowing and stopping rotation of the mandrel at each of the first and second rotational positions thereof.

* * * * *